(12) United States Patent
Frey et al.

(10) Patent No.: US 6,535,596 B1
(45) Date of Patent: Mar. 18, 2003

(54) CALL PROCESSING SYSTEM UTILIZING SUBSCRIBER SERVICES AND PREFERENCES

(75) Inventors: Alan E. Frey, Naperville, IL (US); Susan J. Tripp, Warrenville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/939,353

(22) Filed: Sep. 29, 1997

(51) Int. Cl.⁷ .............................................. H04M 3/42
(52) U.S. Cl. .............. 379/201; 379/201.07; 379/201.08
(58) Field of Search ................................. 379/211, 265, 379/201, 88.05, 88.06, 67, 121, 111, 114, 88.21, 100.07

(56) References Cited

U.S. PATENT DOCUMENTS

| | | | |
|---|---|---|---|
| 4,720,850 A | | 1/1988 | Oberlander et al. ..... 379/90.01 |
| 5,185,785 A | * | 2/1993 | Funk et al. .................. 379/111 |
| 5,222,125 A | | 6/1993 | Creswell et al. ......... 379/88.21 |
| 5,329,578 A | * | 7/1994 | Brennan et al. ............... 379/67 |
| 5,337,351 A | * | 8/1994 | Manabe et al. ........ 379/201.02 |
| 5,381,467 A | * | 1/1995 | Rosinski et al. ............. 379/121 |
| 5,404,396 A | * | 4/1995 | Brennan ...................... 379/157 |
| 5,440,620 A | | 8/1995 | Slusky .................. 379/100.07 |
| 5,442,689 A | | 8/1995 | Buttitta et al. .............. 379/201 |
| 5,590,181 A | | 12/1996 | Hogan et al. ............... 379/114 |
| 5,594,787 A | * | 1/1997 | Ohshima et al. ............ 379/114 |
| 5,631,904 A | * | 5/1997 | Fitser et al. ................. 370/261 |
| 5,703,940 A | * | 12/1997 | Sattar et al. ................ 379/201 |
| 5,841,852 A | * | 11/1998 | He .............................. 379/201 |
| 5,999,610 A | * | 12/1999 | Lin et al. .................... 370/259 |

* cited by examiner

*Primary Examiner*—Ahmad F. Matar
*Assistant Examiner*—Hector Agdeppa
(74) *Attorney, Agent, or Firm*—Grossman, Patti & Brill

(57) ABSTRACT

A method and apparatus is provided for processing a call from a calling party to a called party. The system includes subscriber profiles for both the called and calling parties and a call behavior module. The subscriber profiles which reside in a switch or one or more remote databases comprehensively maintain the subscribed services and preferences of the parties. The call behavior module processes the telephone call in accordance with the subscriber service options and preferences of the called party and the calling party as provided in the subscriber profiles. Call processing is thereby handled more efficiently and reduced risk of feature interactions between the different subscriber services.

37 Claims, 5 Drawing Sheets

CALL PROCESSING SYSTEM UTILIZING SUBSCRIBER SERVICES AND PREFERENCES

BACKGROUND OF THE INVENTION

1. Field of the Invention

In general, the present invention relates to telephone call processing systems, and more particularly to techniques for processing calls based on subscriber profile information.

2. Statement of Related Art

Recent advances in telecommunications technology have led to a significant increase in the variety of telephone services that are now available to consumers. Service providers now offer a variety of services to their subscribers such as call forwarding, call rejection, call waiting, caller ID display, sequence calling, remote access, call redirection, call answer, ring again, charging and privilege options, and the like. These services have greatly enhanced the utility and versatility of telephone systems to consumers. To accommodate this ever increasing array of telephone services, a telephone system may utilize a subscriber profile. A subscriber profile, more particularly, is a database record containing information about how the service is to be performed for a particular subscriber. An example of the use of a subscriber profile is the personal telephone number service described in U.S. Pat. No. 5,440,620, issued on Aug. 8, 1995, entitled "Telecommunications System Subscriber Profile Updating". As described in that patent, a caller who has dialed the personal, e.g., "700 area code", telephone number of a subscriber to the service is connected to a computer-based service adjunct which, upon answering the call, prompts the caller for a so-called "caller identification number" (caller ID). Upon receiving the caller identification number from the caller, such as via telephone push-button input, the system consults a subscriber profile associated with the called personal telephone number to determine whether the caller identification number is valid and, if it is, how the call is to be treated. As examples of various call treatments, the profile may indicate that, upon receiving a particular caller identification number, the call is to be forwarded to the subscriber's home telephone number, to some other subscriber-defined call forwarding telephone number, to a voice messaging system, or to a specified succession of these.

However, telephone systems presently provide subscriber profiling only on a piecemeal basis for a limited number of services. In addition, the rapid development of subscriber services has led to a growing potential for service conflicts between a calling party and a called party who both subscribe to a unique set of services. Such service conflicts, commonly known as feature interactions, are problems which occur when telephone services conflict with each other, when telephony services are ambiguous, or when there is contention for a resource. Petri Dini. et al. in "Feature Interactions in Telecommunication Networks IV" (1997) provide a variety of solutions to this problem, however, the solutions treat the symptoms of the problem and none attempt to resolve the problem itself. Feature interactions may also occur between the services offered to an individual subscriber.

A feature interaction may occur, for example, in the case where a subscriber subscribes to selective call forwarding (SCF) and selective call rejection (SCR). SCF allows the subscriber to forward incoming calls to different locations depending upon the telephone number of the calling party. SCR allows the subscriber to not accept calls depending upon the telephone number of the calling party. Under present systems, SCF and SCR are maintained as separate lists of directory numbers. When a call is placed, a central office switch of the called party compares the calling party's directory number to the SCF and SCR lists of directory numbers. If the number is listed under SCF, the call is forwarded as prescribed. If the number is listed under the SCR list, the call is rejected and the calling party is notified that the call will not be connected. While the original set of independent SCR and SCF lists may not contain any conflicts, as these lists are subsequently updated, especially by the subscriber, conflicts may arise. A feature interaction may therefore occur between SCR and SCF in the case where the calling party's directory number is listed under both SCR and SCF. In such a situation, it is unclear whether the call should be forwarded or whether the call should be rejected. Since the SCF and the SCR lists are compared sequentially, the call will likely be handled according to the list that is compared first. Thus, if the central office switch compares the SCR list first, the call will be rejected even though the directory number is also listed in the SCF list.

In addition to the problem of service conflicts, present telephone systems often only provide the subscriber services for one party, either the calling party or the called party, and do not provide subscriber services for the other party.

In addition to the above-mentioned problems, present telephone systems are also relatively inefficient in the processing of calls according to subscriber profiles. Each subscriber service requires piecemeal processing regardless of whether certain services are related. Generally, the telephone system must individually address each specific subscriber service and determine whether the party has subscribed to that particular subscriber service, as described in the example of SCF and SCR services. Each subscribed service is provided in a list of checks for that subscriber. Thus, each time a new service is implemented, additional checks must be added to the list of checks to provide these new services to the subscriber. The placement of the checks in the list determines how the new services interact with existing services. As the number and complexity of subscriber services increase, the complexity and inefficiencies of present call handling systems similarly increase (in addition to the greater risk of feature interactions).

Present telephone systems also provide limited information to the called party about the calling party. When a call is placed to the called party, the called party may ascertain at most the telephone number and name of the calling party (the caller ID service). Having additional information about the calling party may provide added benefit for processing the call according to the preferences of the called party. For example, the called party may be a customer service line for an international business of which the calling party is a customer. The called party may wish to handle the call differently depending upon the language preference of the calling party. Currently, the called party may presume a language preference based upon the telephone number of the calling party; however, this is not guaranteed.

It is therefore an object of the present invention to provide subscriber services to both the calling party and the called party during a call.

It is another object of the present invention to resolve feature interactions when providing subscriber services to the calling and called party.

It is yet another object of the invention is to provide a comprehensive subscriber profile that incorporates all of the subscriber services and preferences of a subscriber.

Yet another object of the invention is to resolve feature interactions between services subscribed by an individual subscriber.

Still another object is to provide an efficient call processing system.

Another object is to provide timely availability of newer subscriber services.

SUMMARY OF THE INVENTION

In accordance with an embodiment of the present invention, a call processing system is provided for processing a telephone call from a calling party to a called party. The system includes subscriber profiles for the both the called and calling parties, a call behavior module, a subscriber profile module, and end user access modules for the calling party and the called party. The subscriber profiles, which reside locally or in one or more remote databases, comprehensively maintain a list of the subscribed service options and preferences of the called and calling parties. Profiles can be provided for an individual subscriber and/or for a group of subscribers. The call behavior module processes the telephone call in accordance with the subscriber service options and preferences of the called party and the calling party as provided in the subscriber profiles. The end user access module recognizes the different supervisory signals received from the called party and the calling party based on the signaling protocols of the called party channel and the calling party channel, as well as the preferences of the called party and the calling party, and passes these control signals to the call behavior module for processing. When instructed by the call behavior module, the end user access module also generates the appropriate supervisory signals to be sent to the called party and the calling party based on the signaling protocols of the called party channel and the calling party channel, as well as the preferences of the called party and the calling party. The subscriber profile module obtains profile information of the called party and the calling party from the applicable individual and group profiles and provides this information to the call behavior module and the end user access module. Efficient call processing is thereby achieved in accordance with the subscriber services and preferences of both the calling and called parties.

DETAILED DESCRIPTION OF THE INVENTION

For a better understanding of the present invention, reference may be had to the following detailed description taken in conjunction with the appended claims and accompanying drawings.

The present invention is a call processing system which customizes telephone services in accordance with a subscriber profile. A subscriber profile is generally any data regarding the preferences and subscriber services of a subscriber. As preferred, the subscriber profile contains a comprehensive description of all telephone service options and preferences subscribed to by a subscriber. These preferences may include, for example, the subscriber's language preference and the subscriber's preference for dialing numbers (such as by using a keypad or by speaking). The subscriber profile also contains the list of all of the subscriber service options that have been subscribed by the subscriber, including those service options that don't necessarily! require a telephone connection to another party such as, for example, a wake up call service such that a call is placed to the subscriber by the network at a designated time. These service options and preferences are described in further detail herein. The subscriber profile is generally stored in one or more databases which may be maintained within conventional Network Elements (NEs) such as Service Control Points (SCPs), Service Nodes (SNs), other Intelligent Peripherals (IPs), or other intelligent network elements which are available for query by central offices, switches and similar elements of the telecommunications switching network. Such subscribers may be those who subscribe to telecommunications, cable or television programming, multimedia or other services which may be provided on any information infrastructure, regardless of nature or bandwidth. By providing a comprehensive profile of a subscriber and a general procedure for processing calls, calls may thereby be more efficiently handled and various subscriber services of the calling party and the called party may be harmonized.

Figure 1:
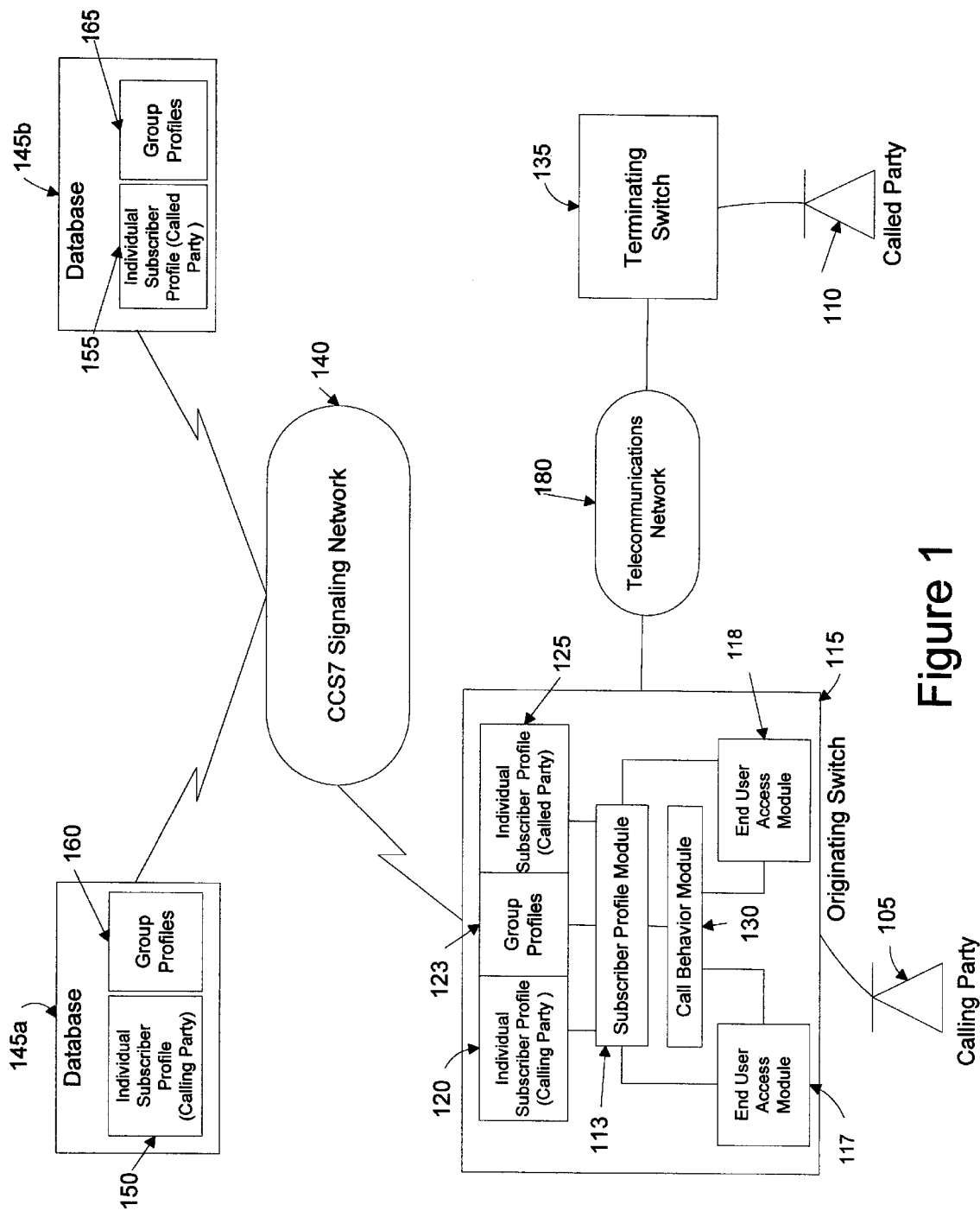
FIG. 1 is a block diagram describing an exemplary embodiment of the invention for processing a call between a calling party and a called party.

FIG. 1 and the following discussion are intended to provide a brief, general description of a suitable telephone communication environment in which the present invention may be implemented. Although not required, the invention will be described in the general context of computer-executable instruction sets, such as program modules. Generally, program modules include routines, programs, objects, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCS), handheld devices, multiprocessor systems, microprocessor-based or programmable consumer electronics, network PCS, minicomputers, mainframe computers, and the like. The present invention may be implemented within any number of telephone networks including existing networks such as the well known AT&T network.

FIG. 1 is a block diagram describing an exemplary embodiment of the invention for processing a call between a calling party 105 and a called party 110. The system includes an originating switch 115 coupled to the calling party 105. The originating switch 115 may be any one of the well-known types of switching equipment coupled to a number of other switches (not shown) and central offices (not shown). The originating switch 115 may be a pulse code modulated (PCM), analog or ATM switch. The originating switch 115 includes a call behavior module 130 for processing a telephone call in accordance with procedures described herein. The originating switch 115 also includes end user access modules 117 and 118 which recognize inputs from and generate outputs to the calling party 105 and/or the called party 110 based on the signaling and communication capabilities of the party's associated telephone channel. The originating switch 115 also includes a subscriber profile module 113 for obtaining the profile information of the calling party 105 and/or the called party 110 under procedures described herein. The end user access modules 117 and 118 are each coupled to the subscriber profile module 113 and the call behavior module 130.

The calling party 105 and the called party 110 may each subscribe to various services. A subscriber profile or subscriber data is generally any data regarding the telephony service options and preferences of a subscriber. These preferences may include, for example, the subscriber's language preference and the subscriber's dialing preference (such as, for example, using a keypad or by speaking). As preferred, subscriber profile contains a comprehensive list of all the telephone service options and preferences subscribed to by a subscriber. The subscriber profiles for the calling party 105 and the called party 110 may reside within one or more local databases (designated as individual subscriber profile 120 and 125, at the originating switch 115 or in remote databases within the telephone network 145a and 145b (designated as individual subscriber profile 150 and 155). Alternatively, part or all of the list of the telephone service options and preferences subscribed to by the calling party 105 or the called party 110, may reside within group profiles located locally (designated as group profiles 123) or remotely (designated as group profiles 160 and 165). Group profiles 123, 160 and 165 contain a list of service options and preferences which are common to a predetermined group of subscribers. A subscriber may therefore have certain general service options and preferences identified in a group profile and other more specific service options and preferences identified in his/her individual subscriber profile. Alternatively, a subscriber may have all of his/her service options and preferences listed only in either a group profile or an individual subscriber profile. As shown in FIG. 1 and the above description, individual subscriber profiles and group profiles may be located in a number of locations within the telephone network. Those skilled in the art will appreciate that the group profiles of the present invention may include any form of groupings including, but not limited to, by business unit or market segment.

Figure 2:
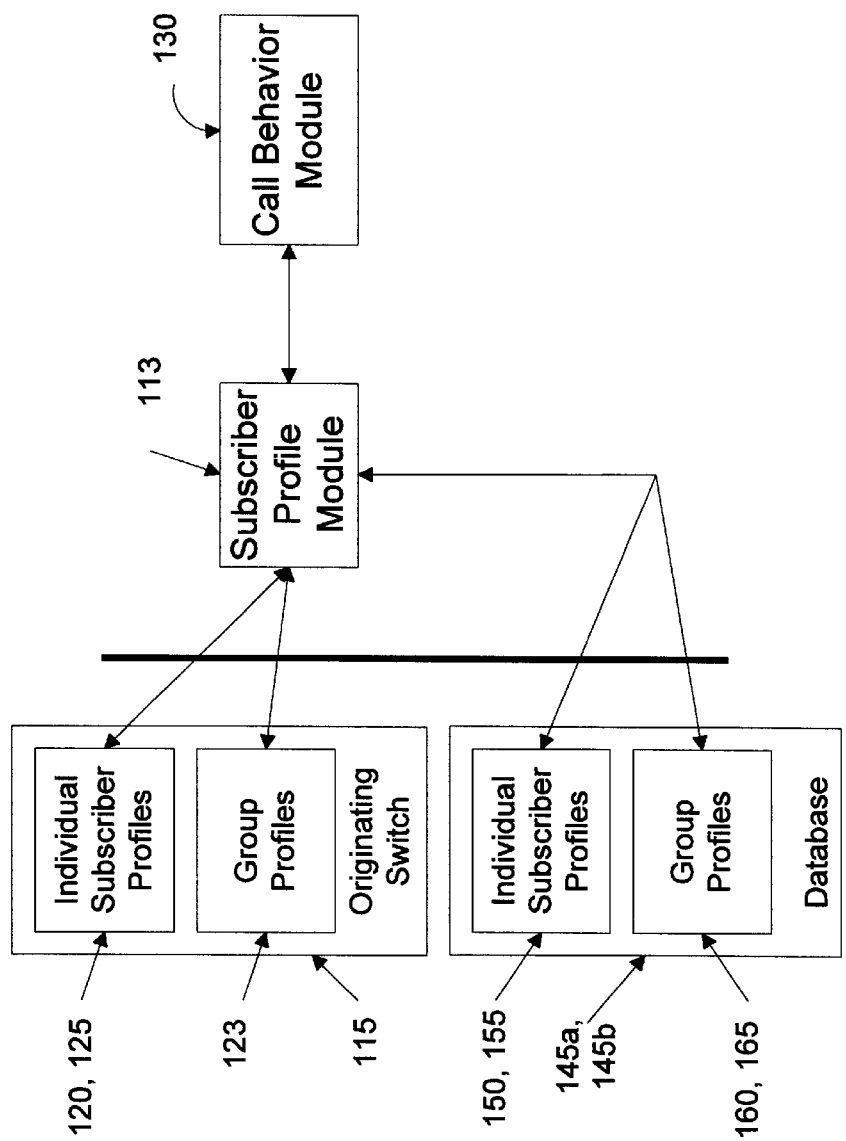
FIG. 2 is a schematic diagram depicting various locations where subscriber profiles may be stored and retrieved.

FIG. 2 is schematic diagram depicting various locations where individual and group profiles may be stored and retrieved. Databases 145a and 145b, which contain individual subscriber and/or group profile information of the calling party 105 and called party 110 respectively, may be separate databases or part of a single database. Subscriber profile module 113, which typically resides in a switch, such as the originating switch 115, is coupled to directly access profile information from individual subscriber profiles 120 and 125 and group profile 123, and is coupled to access information from the individual subscriber profiles 150 and 155 and group profiles 160 and 165. The subscriber profile module 113 provides this information to the call behavior module 130 and the end user access modules 117 and 118. The call behavior module 130 and the end user access modules 117 and 118 may use this information for processing the telephone call in accordance with the particular service options and preferences of the calling party 105 and/or the called party 110.

Referring back to FIG. 1, originating switch 115 is coupled to the databases 145a and 145b via a Common Channel Signaling 7 (CCS7) signaling network 140 which is well known in the telecommunications industry. Alternatively, any other signal network may be implemented. The called party 110 is coupled to a terminating switch 135. Switches 115 and 135 are thereby coupled together by a telecommunications network 180. Those skilled in the art will appreciate that the invention may be practiced with any number of public switched telephone network configurations.

Figure 3:
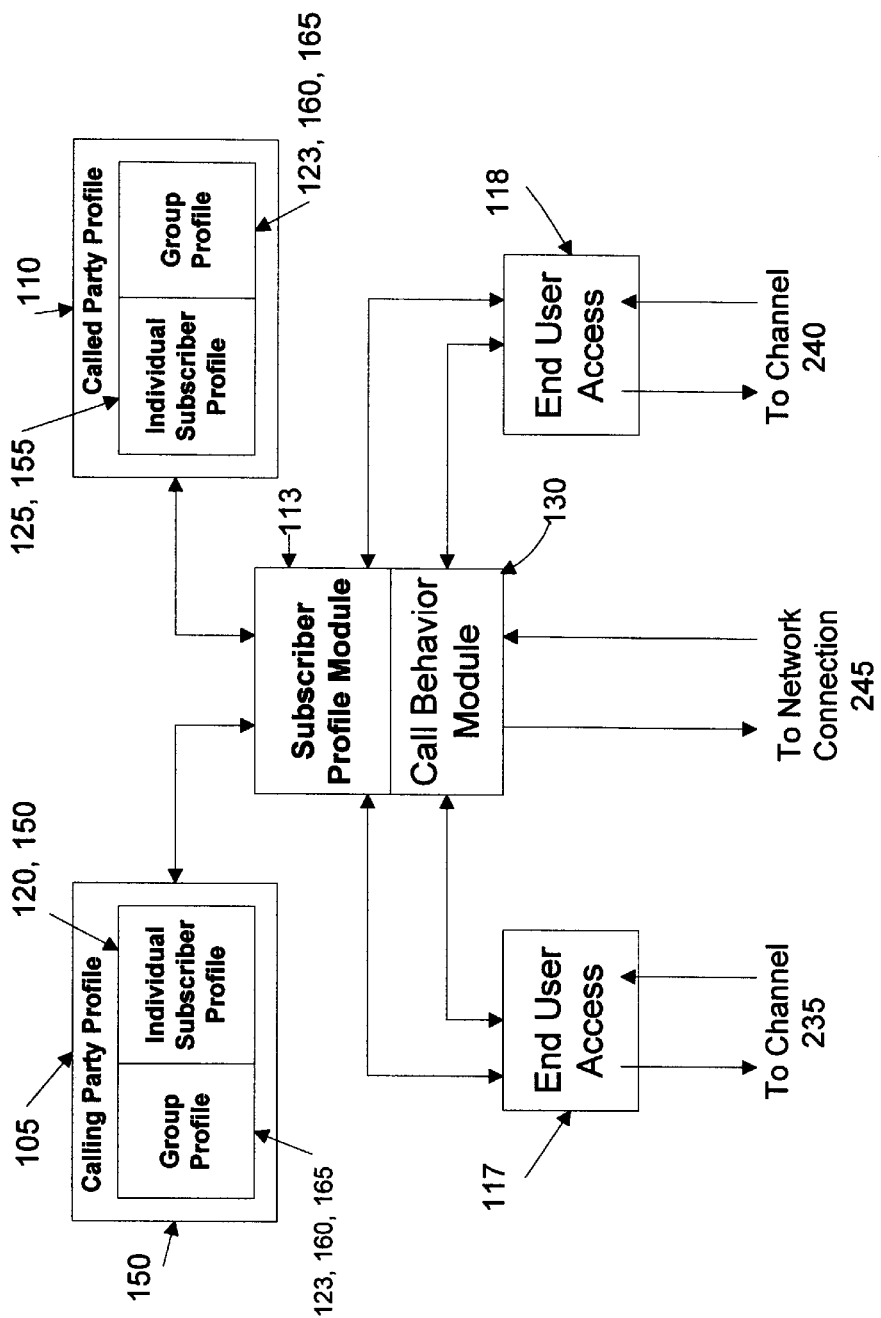
FIG. 3 is a schematic diagram describing the interactions between the components of a telephone network when a call is placed in accordance with the present invention.

FIG. 3 is a schematic diagram describing the interactions between the components of a telephone network when a call is placed in accordance with the present invention. Channel 235 is generally the physical connection between the telephone network and the calling party 105. Channel 240 is generally the physical connection between the telephone network and the called party 110. Channels 235 and 240 may use any type of signaling protocol including, but not limited to, dial pulse, DTMF, ISDN, and CCS7. Channels 235 and 240 may also be able to carry any form of telecommunications signals including, but not limited to, voice, data, and video signals. Channels 235 and 240 are coupled to end user access modules 117 or 118 respectively. The end user access modules 117 or 118 track the signaling and communication capabilities of channels 235 and 240, and use this information for handling inputs and outputs to calling party 105 and called party 110. For instance, for a voice connection an audio announcement can be provided, for a data connection a text string can be provided, and for a video connection a video clip can be provided.

The end user access module 117 or 118 may use information about the preferences of the calling party 105 and the called party 110 provided by the subscriber profile module 113 for handling inputs and outputs to calling party 105 and called party 110. For example, language preference information for a party may be queried by the end user access module 117 or 118 from the subscriber profile module 113. The end user access module 117 or 118 may have different versions of announcements, text strings, and video clips in different languages, and may use the appropriate version based on the language preference of the party and the type of connection to the party. Additionally, the end user access module 117 or 118 may query the subscriber profile module 113 for the dialing preference information for a party, for example if the subscriber prefers to dial by using their keypad or by speaking. The end user access module 117 or 118 may use this information to recognize inputs from the party when the party pushes buttons on their keypad or when the party speaks.

End user access modules 117 and 118 operatively couple the call behavior module 130 with the calling party 105 and the called party 110. Inputs from the parties 105 and 110 received by the end user access modules 117 and 118 are provided to the call behavior module 130, which processes the inputs in accordance with procedures described herein. The end user access module 117 or 118 may also provide information to the call behavior module 130 relating to the geographic locations of the calling party 105 and the called party 110. Geographic location of a party may be determined from network interface point information of the channel connecting the party to the network stored in the end user access module 117 or 118. For example, if the channel connecting the party to the network is a wired line to a residence, the address (including street, city, county/province, country, and postal code) of the Network Interface Unit (NIU) for that wired line stored in the end user access module 117 or 118 may be provided to the call behavior module 130 for providing the location of the party. If the channel connecting the party to the network is a wireless connection, the address of the cell site transmitting and receiving signals from the cellular phone being used by the party may be used as the location of the party. The location of a party may be utilized by the call behavior module 130 to process the telephone call in accordance with subscriber services of the other party. For example, the call behavior module 130 may route the call to the called party's branch or facility which is nearest to the geographic location of the calling party 105. Advantageously, the geographic location of a party can be determined more accurately than in the prior art, which used the caller ID of the calling party 105 to determine geographic location.

As shown in FIG. 1, the call behavior module 130 is preferably implemented within originating switch 115. Alternatively, call behavior module 130 may be implemented in a remote database. The call behavior module 130 captures the decision and steps that occur in any call in accordance with the present invention. Referring back to FIG. 3, the call behavior module 130 is coupled to the end user access module 117 or 118. The end user access module 117 or 118 passes inputs received from the calling party 105 and the called party 110 to the call behavior module 130. After passing an input to the call behavior module 130, the end user access module 117 or 118 waits for the call behavior module 130 to identify what status information (if any) should be output to the calling party 105 and/or the called party 110. Call behavior module 130 may access information regarding the calling party 105 and the called party 110 by querying information from the subscriber profile module 113 which in turn retrieves the information from the calling party individual subscriber profile 120 or 150, called party individual subscriber profile 125 or 155 and/or group profiles 123, 160 or 165. Alternatively, the subscriber profile module may prompt the party to provide subscriber service information. For example, the party may be prompted to enter a keyword or code describing, for example, a language preference or a subaccount billing number. As described in further detail herein, the individual subscriber profiles 120, 125, 150 and 155 (and/or the group profiles 123, 160 and 165) provide a comprehensive description of subscriber service options and preferences of each subscriber. Advantageously, the telephone call behavior module 130 may utilize this information to efficiently process a call taking into account the individual service options and preferences that are subscribed to by both the calling and called parties 105 and 110. As preferred, the call behavior module 130 provides a uniform set of procedures for processing a telephone call taking into account all of the subscriber services and preferences of both the called party 110 and the calling party 105, rather than engaging in multiple protocols for each subscriber service. The procedures under the call behavior module 130 also serve to resolve conflicts between the services of the calling party 105 and the called party 110. As preferred, the call behavior module 130 is thereby service independent.

Figure 4:
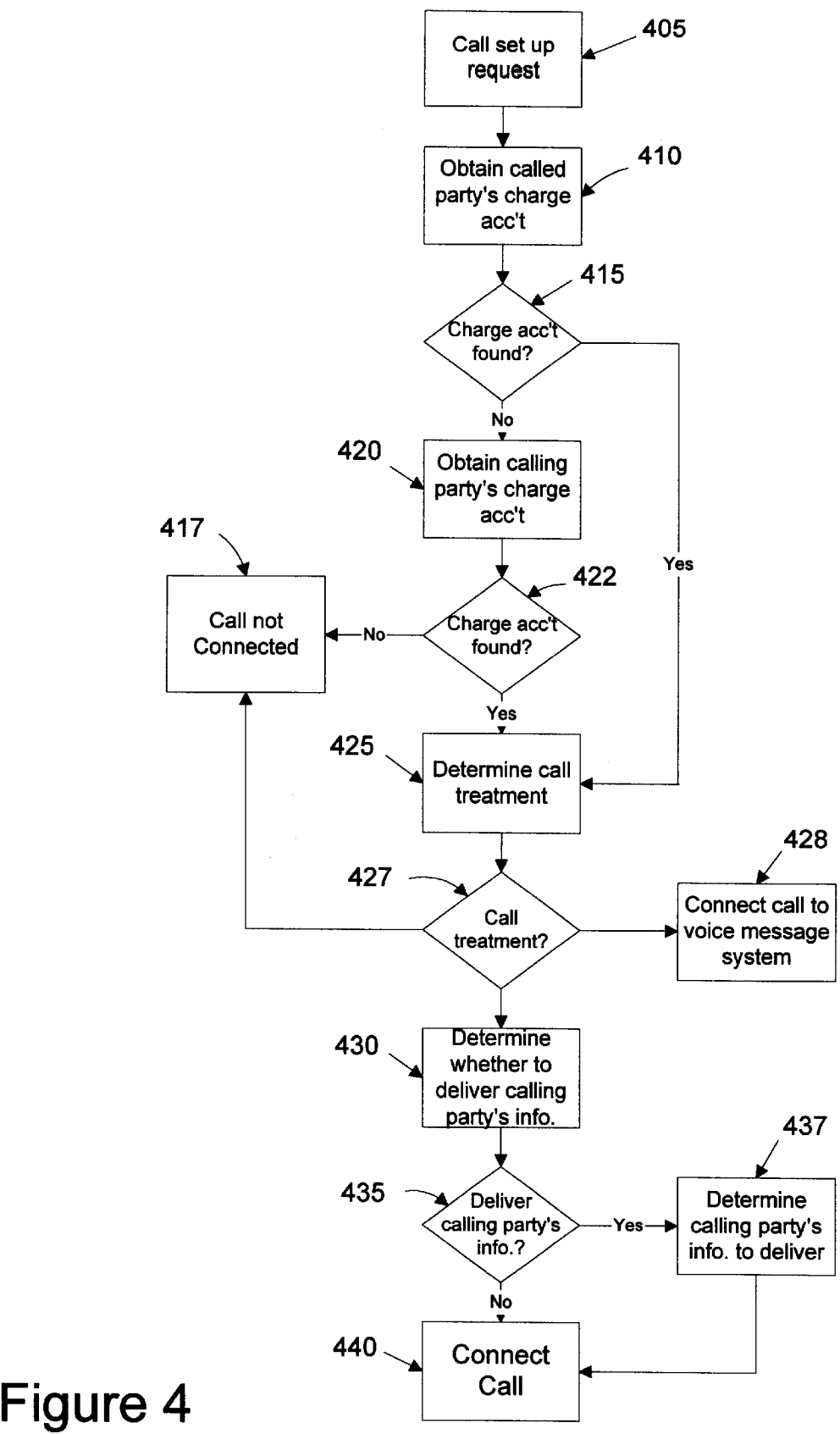
FIG. 4 is a flow chart providing an exemplary description of the procedure followed by the call behavior module for processing a telephone call setup in accordance with the present invention.

FIG. 4 is a flow chart providing an exemplary description of the uniform procedure for processing a telephone call set up in accordance with the present invention. In this example, the procedure for setting up a telephone call connection may be conceptualized into three phases: 1) charge set-up, 2) call treatment and 3) caller information. It will be apparent to those skilled in the art that other procedures are also conceivable. At step 405, when a call is initiated by a calling party 105, a signal is sent to the end user access module 117.

The end user access module 117 reports a call setup request to the call behavior module 130. The call request generally includes the calling party's telephone number and the called party's telephone number. Depending upon the case, the calling party 105 may be identified by a number of methods including, but not limited to, checking the telephone number from where the calling party 105 placed the call, querying the calling party 105 to enter a keyword, or any combination of these options.

Beginning with step 410, the call behavior module 130 needs to determine which account to charge the call. First at step 410, the call behavior module 130 queries the subscriber profile module 113 to determine if the called party 110 is willing to be charged for the telephone call, and if so what account should be used. The subscriber profile of the called party 110 may be set up to accept all charges, not to accept any charges, or to accept/deny all charges based on particular information about the caller. For example, the subscriber profile may be set up to not accept. charges for calls from callers outside the country. At step 415, the subscriber profile module 113 locates the relevant profile information of the called party 110 (whether it resides locally or remotely and whether the information is in an individual profile or in a group profile) and retrieves the relevant information. If the called party 110 is willing to pay for the call, then the called party's billing number, which may optionally include a subaccount, is provided by the subscriber profile module 113 to the call behavior module 130. If not, then at step 420 the call behavior module 130 requests the subscriber profile module 113 to determine whether the calling party 105 is willing to be charged for the call. At step 422, the subscriber profile module 113 determines whether the calling party 105 is willing to be charged by locating the relevant profile information of the calling party 105. If the calling party 105 will accept the charges, then the calling party's billing number, which may optionally include a subaccount, is provided to the call behavior module 130 by the subscriber profile module 113. At step 417, if the calling party 105 is not willing to be charged, the call, behavior module 130 will instruct the end user access module 117 to send a message to the calling party 105 notifying them that the call will not be set up.

Once charge information is resolved, at step 425, the call behavior module 130 next determines how the called party 110 wishes to treat the call. The subscriber profile module 113 for the called party 110 is queried by the call behavior module 130 to determine how the called party 110 wishes to have the call treated. At step 427, the subscriber profile module 113 locates the relevant profile information and provides it to the call behavior module 130. For example, the subscriber profile module 113 may determine which call treatment option (such as, for example, route the call to a certain number, inform the calling party 105 the call will not be connected, or take a message from the calling party 105) has been subscribed to, and provides this information to the call behavior module 130. Alternatively, the profile may require the calling party 105 to input certain information about the calling party 105. The subscriber profile module 113 thereby notifies the end user access module 117 to obtain this information from the calling party 105 before the subscriber profile module 113 determines how to handle the call. In the case where the option to take a message has been subscribed to, the call may be connected to a voice messaging system at step 428. Alternatively, the calling party 105 may be notified that the call will not be completed at step 417. It will be apparent to those skilled in the art that other processing instructions are also conceivable.

In the case where the option to route the call to a number has been subscribed to, the following steps are undertaken. Beginning at step 430, the call behavior module 130 determines whether any information about the calling party 105 should be delivered to the called party 110. This information may be, for example, the calling party's directory number, language preference, geographic location, or the calling party's name. Other information may also be provided. First at step 430, the call behavior module 130 queries the subscriber profile module 113 to determine whether the called party 110 wants information about the calling party 105 to be delivered. At step 435, the subscriber profile module 113 locates the relevant profile information of the called party 110 and provides it to the call behavior module 130. In the case where the called party 110 does not subscribe to the delivery of any calling party information, no such information will be provided. In the case where the called party 110 does wish information about the calling party to be delivered, subscriber profile module 113 provides this service option to the call behavior module 130. At step 437, the call behavior module 130 queries the subscriber profile module 113 for the requested information about the calling party 105 that should be delivered to the called party 110. In the case where the calling party 105 does not want the caller's identity or other information to be delivered, the subscriber profile module 113 provides the call behavior module 130 with a blank value for the calling party's identity or other information. The call is then connected at step 440.

Once the call is connected, the call behavior module 130 may perform a variety of different functions depending upon the service options and preferences listed in the particular subscriber profile of the called and calling parties. For example, the call behavior module 130 may query the subscriber profile module 113 to determine how the called party 110 wishes to handle a call if the called party 110 is unavailable to answer the call. The called party's subscriber profile will provide information as to whether to route the call to another number, notify the caller that the call will not be completed, or take a message using the mailbox assigned to the called party 110.

As preferred, the call behavior module 130 operates independently of the subscriber profiles. The call behavior module 130 simply queries the subscriber profile module 113 for the relevant subscriber profile information or preferences that affect the processing of the call. The subscriber profile module 113 thereby performs the task of ascertaining the relevant subscriber profile or preference information and provides this information to the call behavior module 130. As service providers offer newer services and features, appropriate changes can be made to the subscriber profiles and, if necessary, to the subscriber profile module 113. However, the call behavior module 130 is not affected by these types of changes. Examples of the types of information that the call behavior module 130 may query are described in FIG. 4 and accompanying discussion.

Advantageously over the prior art, the call behavior module 130 may readily obtain from the subscriber profile module 113 information regarding which of a number of service options to use, thereby improving the overall efficiency of call processing. The call behavior module 130 is also responsible for resolving conflicts between the services of the called party 110 and calling party 105. For example, in the case where both parties have agreed to be charged for a call, the call behavior module 130 may resolve this conflict by charging the called party 110. As shown in the description with respect to FIG. 4, this conflict is resolved by first determining whether the called party 110 is willing to be charged for the call, and if so, to skip the step of determining whether the calling party 105 will accept the calling charge.

For each query made by the call behavior module 130 to the subscriber profile module 113, one option from a list of possible choices is provided by the subscriber profile module 113. For example, the list of options for the initial treatment for a call to a subscriber may include: 1) route the call to a number, either the number as dialed or a different number, 2) notify the calling party 105 the call will not be set up, or 3) take a message using the mailbox of the called party 110. The subscriber profile module 113 retrieves from the subscriber profile data the desired call treatment and forwards it to the call behavior module 130. The choice of which option to use on a call may be based on a variety of factors including, but not limited to, the time of day, the identity of the other party, the location of the other party, the language preference of the other party, or a keyword entered by one of the parties on the call.

The subscriber profile records can be arranged in many different ways. No matter how the subscriber profile records are organized, the subscriber profile module 113 provides a uniform response to the call behavior module 130. In current telephone systems, the subscriber profile data is typically organized to indicate when an option other than the "normal" or "default" option for a particular preference should be used. For example, Selective Call Forwarding Data is a set of exception records that indicate when the route to a forwarding number option for the initial treatment preference is to be used rather than the usual "route to the number as dialed" option. Likewise, the Selective Call Rejection data indicates when the notify calling party the call will not be set up option for the initial treatment preference is to be used. When the subscriber profile data is arranged in this manner, the subscriber profile module 113 must check all of the exception records to see if there is a match for this particular call. If a match is found, the option associated with the matching exception record will be used for the call. If no match is found, the default option assumed by the subscriber profile module 113 will be used for the call. As mentioned earlier, it is possible to create multiple exception records that could apply the same call, either intentionally or inadvertently, thereby resulting in a risk of feature interactions. If this occurs, the order in which the subscriber profile module 113 checks the exception records affects which option is used for the call. In this embodiment, the subscriber profile module 113 resolves the feature interaction and provides a single response to the call behavior module 130. Typically the order of checking would be hidden in the program logic of the subscriber profile module. As a result, this resolution by the subscriber profile module 113 may not be the desired choice. Alternatively one experienced in the art could devise a scheme to allow the telephone network administrator to specify the order.

In a preferred embodiment, subscriber profile information may be organized in either group and/or individual subscriber profiles. Group profiles may identify if the same service options or preferences should be used for all subscribers in a particular group. For example, if the "route call as dialed" option is the only option allowed by the telephone network administrator for the initial treatment for calls to a particular group of subscribers, that option may be set accordingly in the group profile. On the other hand, if the individual subscribers are offered a choice of options, the group profile may indicate that an individual profile, which provides profile information on a per subscriber basis, must be checked to determine the option to be used for a particular subscriber in the group. The individual profile for a subscriber may identify whether the same option should be used for all of their calls, or if different options are to be used for different calls depending on such factors as the identity of the other party on the call, the other party's location, the other party's language preference, the time of day, and/or keywords entered by one of the parties on the call. If the same option is not to be used on all calls, then per call preference profile data may identify the particular option for a preference to be used for a particular call or set of calls (e.g., the option to be used for calls received during a particular hour of the day). An option for each subscriber service and preference is thereby specified in one of the profiles (group, individual, or per call preference profile).

Taking the example of the SCR and SCF services in accordance with a preferred embodiment of the subscriber profile information described above, the subscriber profile of the called party 110 includes per call preference profiles for the desired call treatment depending upon the various calling party numbers. Thus, for a given call, the call treatment option specified in the per call preference profile for the calling party's number may be applied. In the preferred embodiment, the SCF and SCR services are no longer provided as separate procedures but rather they are incorporated in the subscriber profile as treatment information based on directory numbers of the calling party 105. Under this embodiment of the subscriber profile information, potential feature interactions may be resolved more favorably.

Advantageously, the subscriber profile module 113 need not assume a "default" option for any option, thereby allowing the telephone network administrator to easily change even the most common behaviors for a call by simply updating the subscriber profile data of a subscriber or a group of subscribers. For example, if the administrator begins to offer all subscribers the choice of leaving a message when a number is busy, the option specified in a group profile for the second treatment for a call can be set to the take a message option rather than the notify calling party call will not be set up option. In the case where such changes are to be made for some but not all of their subscribers, a new group profile may be created for the subscribers who are to have their services changed.

The organization of subscriber profile data as described in the preferred embodiment also minimizes the amount of data that has to be stored in the network while still allowing the option for any preference to be different for any call. For example, any data that is common to all of the members in a group need not be replicated in each individual profile. Additionally, this organization of the subscriber profile data essentially eliminates the risk of more than one option for a preference being inadvertently selected for a particular call, thereby reducing the risk of feature interactions. The call behavior module 130 thereby obtains necessary information from the subscriber profile module 113 for processing the telephone call. Advantageously, the call behavior module 130 operates independently from the formats of the subscriber profiles. Examples demonstrating the assignment of subscribers to groups, as well as some of the preferences that could be specified in a group profile, an individual profile, and per call preference profiles, are described further herein.

Figure 5:
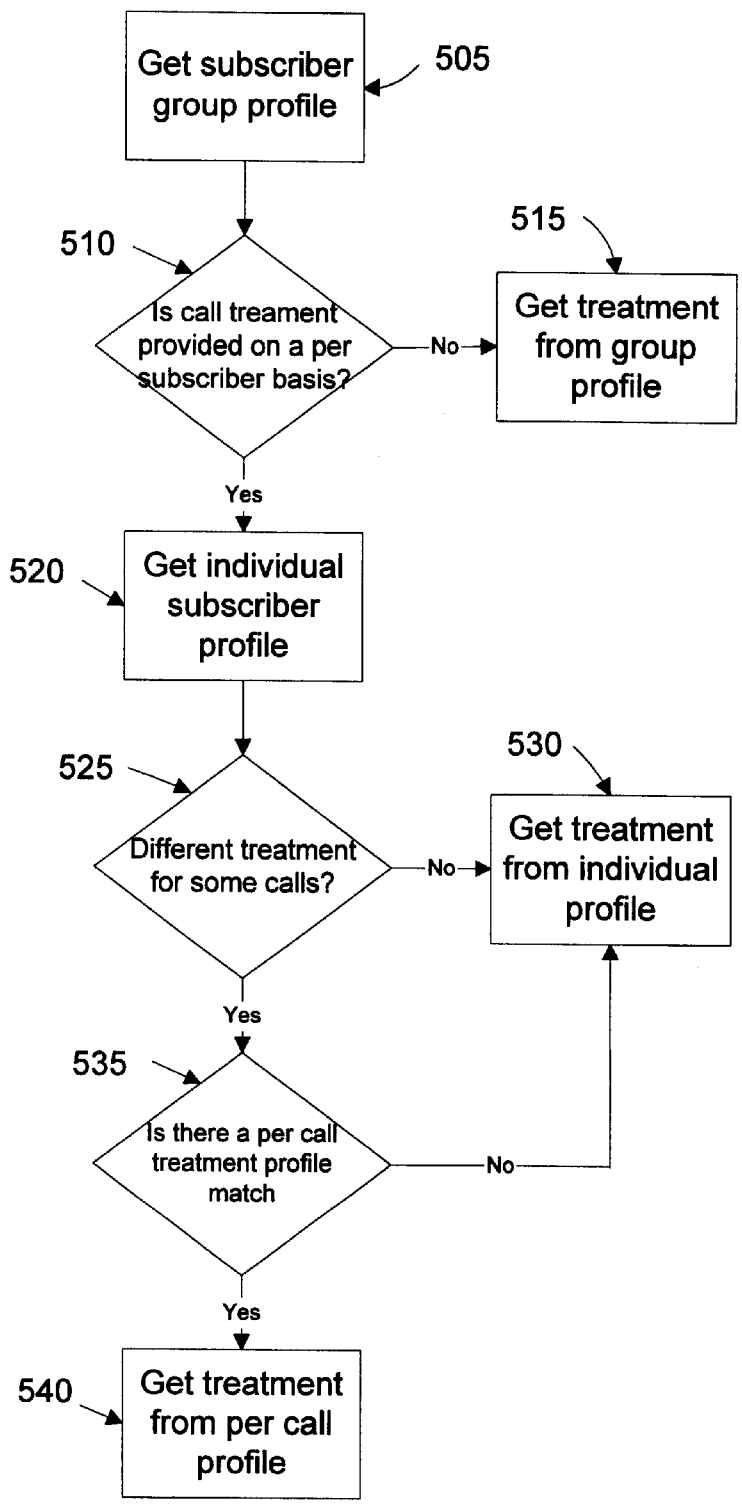
FIG. 5 is a flow chart providing an exemplary description of the procedure followed by the subscriber profile module for retrieving call treatment information in accordance with the present invention.

FIG. 5 is a flow chart providing an exemplary description of the procedure followed by the subscriber profile module 113 for retrieving call treatment information in accordance with the preferred embodiment of the present invention. The subscriber profile module 130 will determine which call treatment option (for example, route the call to a certain number, inform the calling party 105 that the call will not be connected, or take a message from the calling party 105) is to be used for the call. The called party 110 may also seek to treat the call differently depending upon a number of factors including, but not limited to, the time of day, geographic location of the calling party 105, or caller response. Depending upon the circumstances, the subscriber profile module 113 may require certain information regarding the calling party 105, such as the calling party's language preference. In the case where language preference is required, for example, the call may be routed to an operator of the called party 110 who speaks the preferred language, or a message (e.g., an to announcement) may be returned to the calling party 105 in the preferred language. Once such information regarding the calling party 105 is determined, the subscriber profile module 113 is able to determine the call treatment option based on the called party's subscriber profile and provides this information to the call behavior module 130.

The procedure of FIG. 5 is initiated when the call behavior module queries the subscriber profile module 113 to obtain call treatment information for the call (step 427 of FIG. 4). At step 505, the subscriber profile module 113 determines whether the called party 110 is assigned a group profile. If the called party is not assigned a group profile, step 520 is performed (described below). If the called party is assigned a group profile, at step 510 the subscriber profile module 113 determines whether the initial call treatment for the call is specified in the group profile or whether it is specified on a per subscriber basis. At step 515, if the treatment is specified in the group profile, the treatment information is retrieved and provided to the call behavior module 130. In the case where the treatment is specified on a per subscriber basis, the subscriber profile module 113 accesses the individual subscriber profile of the called party 110 at step 520. The called party 110 may have a subscriber profile (group or individual) such that the determination on how to treat the call is made on a wholesale basis such that all calls will be treated the same way. Alternatively, the called party subscriber profile may indicate the treatment for the call depends upon one or more per call parameters such as the calling party's identity, the time of day, etc. At step 525, the individual subscriber profile is checked to determine whether the choice of call treatment depends on factors such as the time of day, and/or information about the calling party 105. If the same treatment is to be used for all calls, then at step 530, the general call treatment information as specified in the individual subscriber profile is retrieved and provided to the call behavior module 130. If the call treatment depends on per call parameters, the subscriber profile module 113 at step 535 determines whether there is a per call treatment profile matching the parameters of the pending call. If there is such a matching per call treatment profile, the call treatment information as specified in the per call treatment profile is retrieved and provided to the call behavior module 130 at step 540. If no such matching per call treatment profile exists, then at step 530 the general call treatment information as specified in the individual subscriber profile is retrieved and provided to the call behavior module 130. The subscriber profile module 113 undertakes similar procedures when obtaining other such information for the call behavior module 130 (for example, steps 415, 422 and 435 of FIG. 4).

Advantageously, the call behavior module 130 operates independently from the formats of the subscriber profiles such that changes to the subscriber profiles and the subscriber profile module 113 (resulting, for example, from newer services that are offered) does not require a change to the call behavior module 130. Newer subscribed services of a party may be updated in that party's subscriber profile and, if necessary, in the subscriber profile module 113 without requiring any changes in the call behavior module 130. The call handling procedures of the call behavior module 130 remain the same even with different embodiments of the subscriber profiles and the subscriber profile module 113. The call behavior module 130 simply queries the subscriber profile module 113 for necessary information to process the telephone call and the subscriber profile module 113 performs the task of determining where the queried information is located, resolving any potential conflicts in the subscriber profiles, and providing the queried information to the call behavior module 130.

Similarly, the call behavior module 130 may process a call regardless of the particular signaling and communications capabilities of the channels to the parties 105 and 110. Since the end user access module 117 and 118 customizes messages from the call behavior module 130 to the party 105 or 110 in accordance with the particular communications capabilities (e.g., voice, data, or video) and preferences (e.g., language preference) of the party 105 or 110, the call behavior module 130 may process the telephone call regardless of these variables. Further, changes in communications capabilities or preferences of the calling party 105 or called party 110 may be accounted for in the end user access module 117 or 118 without requiring a change in the call behavior module 130.

Preference information may also be used to provide added functionality to the system. As an example, the call behavior module 130, during the processing of a call, may query the subscriber profile module 113 for certain preferences of the called party 110. Such preferences may include, for example, language preference of the calling party 105. Language preference may be used by the call behavior module 130 during the processing of a call, for example, to forward the call to the appropriate line of the called party 110 such as a customer operator who speaks the preferred language or an operator who resides nearest to the geographic location of the calling party 105. Another example is that the language preference may be retrieved by the end user access module 117 from the subscriber profile module 113 to provide a message (e.g., an announcement) to the calling party 105 in the preferred language. Advantageously, a called party 110, such as a business, may utilize preference information that is delivered with the call to properly handle calls, such as customer service calls, in accordance with the information retrieved regarding the calling party 105. Each called party 110 would not be required to maintain such information in their own private databases according to the directory number of the calling party 105 or have separate dialing numbers for different languages or geographic regions. For similar purposes, the calling party 105 may also access preference information relating to the called party 110. By providing preference information in the subscriber profile, such information is advantageously contained in a central location and may be utilized by a number of subscribers in a number of different ways. The telephone system thereby may provide added functionality to subscribers by utilizing preference information in the subscriber profiles. Other examples of preferences of the subscriber profile include, but are not limited to, language preference, authorization code dialing preferences, sub-account code dialing preferences, collect call code/call prompter response dialing preferences, credit card number dialing preferences, sequence calling dialing preferences. Such preferences allow the call behavior module 130 to process the telephone call in accordance with the parties' preferences.

Advantageously, the call behavior module 130 together with the subscriber profiles 120, 150 and 125, 155 provide a wide range of enhanced calling products and features to carriers and individual users. One or more carriers may customize their subscriber profiles with desired services and preferences and use the call processing system to obtain carrier-unique and customer-unique, customized services and features. Call processing may be achieved more efficiently and with minimized risk of feature interactions.

The following List A provides and example of information contained within an individual subscriber profile. This information may be complemented with information from a group profile of which the individual is a member.

---

LIST A

---

Subscriber Directory Number _____
Subscriber Allowed To Make Calls _____ (Yes/No)
    Caller Charge Account and and Charging Privileges
        Privileges For Some Calls Based On Called # _____ (Yes/No)
        Charging Privileges For All Other Calls
            Charge Account _____ (None/Caller's DN/Caller's DN If Caller Knows PIN)
            Sub-Account Code _____ (None/Collected From Caller/ sub-account #)
            Allowed To Charge Call Fees _____ (Yes/No)
            Allowed To Charge Any Caller Line Fees _____ (Yes/No)
            Allowed To Charge Any Callee Line Fees _____ (Yes/No)
    Caller Id To Deliver To Callee _____ (None/Caller's DN)
    Set Of Commands Available While Waiting For Answer _____ (None/cmd set)
    Set Of Commands Available After Call Answered _____ (None/cmd set)
    Set Of Commands Available After Callee Disconnects _____ (None/cmd set)
Subscriber Allowed To Receive Calls _____ (Yes/No)
    Callee Charge Account and and Charging Privileges
        Privileges For Some Calls Based On Calling # _____ (Yes/No)
        Charging Privileges For All Other Calls
            Charge Account _____ (None/Callee's DN/Callee's DN If Caller Knows Code)
            Allowed To Charge Call Fees _____ (Yes/No)
            Allowed To Charge Any Caller Line Fees _____ (Yes/No)
            Allowed To Charge Any Callee Line Fees _____ (Yes/No)
    The following choices for handling a call to this Called Number are available:
        The call can be routed (routing number could be Callee's DN or a redirection #)

-continued

LIST A

The caller can be notified that the call will not be set up
A message can be taken using the mailbox assigned to the callee's DN
If the choice is not the same for all calls, mark which per call call factors affect the choice
    Choice For Some Calls Based On Calling # and TOD _____ (Y/N)
    Choice For Some Calls Based On Calling # _____ (Y/N)
    Choice For Some Calls Based On Caller's Lang Preference and TOD _____ (Y/N)
    Choice For Some Calls Based On Caller's Lang Preference _____ (Y/N)
    Choice For Some Calls Based On Caller's Location and TOD _____ (Y/N)
    Choice For Some Calls Based On Caller's Location _____ (Y/N)
    Choice For Some Calls Based On TOD _____ (Y/N)
    Choice For Some Calls Based On Caller Response _____ (Y/N)
        Prompt Message _____ (msg name)
        Interruptible _____ (Yes/No)
        Pay For Voice Dialing Of Response By Caller _____ (Yes/No)
        Re-prompt Message _____ (msg name)
    Initial Call Treatment For All Other Calls To This Subscriber
        Complete/Route Call _____ (Yes/No)
            Routing Number
            Deliver Caller Id _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Notify Caller Call Will Not Be Set Up _____ (Yes/No)
            Msg/Tone To Inform Caller Call Will Not Be Setup _____
        Take A Message _____ (Yes/No)
            Mailbox Number
            Message Informing Caller Message Being Taken _____
If the Initial Setup Attempt For The Call could not be completed (no ckt or busy),
one of the following choices for handling the call must be made.
Call Treatment If Call Unable To Be Completed
    Notify Caller Call Will Not Be Set Up _____ (Yes/No)
        Msg/Tone To Inform Caller Call Will Not Be Setup _____
    Redirect Call _____ (Yes/No)
        Redirection Number
        Deliver Caller Id _____ (Yes/No)
        Message/Tone For Caller While Waiting For Answer _____
        Amount of Time To Wait For Answer _____ (# sec)
        Callee Command Set Once Callee Answers _____
        Callee Command Set After Caller Has Disconnected _____
    Take A Message _____ (Yes/No)
        Mailbox Number
        Message Informing Caller Message Being Taken _____
If the Initial Setup Attempt For The Call was set up but not answered,
one of the following choices for handling the call must be made.
Call Treatment If Call Not Answered
    Notify Caller Call Will Not Be Set Up _____ (Yes/No)
        Msg/Tone To Inform Caller Call Will Not Be Setup _____
    Redirect Call _____ (Yes/No)
        Redirection Number
        Deliver Caller Id _____ (Yes/No)
        Message/Tone For Caller While Waiting For Answer _____
        Amount of Time To Wait For Answer _____ (# sec)
        Callee Command Set Once Callee Answers _____
        Callee Command Set After Caller Has Disconnected _____
    Take A Message _____ (Yes/No)
        Mailbox Number
        Message Informing Caller Message Being Taken _____
If the Second Setup Attempt For The Call could not be completed,
one of the following choices for handling the call must be made.
Call Treatment If Second Attempt Unable To Be Completed
    Notify Caller Call Will Not Be Set Up _____ (Yes/No)
        Msg/Tone To Inform Caller Call Will Not Be Setup _____
    Take A Message _____ (Yes/No)
        Mailbox Number
        Message Informing Caller Message Being Taken _____
User Interaction Options For Subscriber
    Language Preference _____ (English/Spanish/ ... )
    Auth Code/Collect Call Code/Call Prompter Response Dialing Preferences
        Dialing Method _____ (Keypad/Voice or Keypad)
        Pre-Digit Time Interval _____
        Inter-Digit Time Interval _____
        Number Of Retries _____
    Sequence Calling Dialing Preferences
        Prompt Message/Tone _____
            Interruptible _____ (Yes/No)

LIST A (continued)

| | |
|---|---|
| Dialing Method | _____ (Keypad/Voice or Keypad) |
| Pre-Digit Time Interval | _____ |
| Inter-Digit Time Interval | _____ |
| Number Of Retries | _____ |
| Re-prompt Msg/Tone | _____ |
|     Interruptible | _____ (Yes/No) |
| PIN/Authorization Code Dialing Preferences | |
| Prompt Msg for PIN Code For This Dir # | _____ |
| Interruptible | _____ (Yes/No) |
| PIN Authorization Code For This Directory # | _____ |
| Re-prompt Message | _____ |
|     Sub-Account Code Dialing Preferences | |
| Prompt Msg for Sub-Account Code For This Dir # | _____ |
| Interruptible | _____ (Yes/No) |
| Re-prompt Message | _____ |
|     Collect Call Code Dialing Preferences | |
| Prompt Msg for Collect Call Code | _____ |
| Interruptible | _____ (Yes/No) |
| Collect Call Code For This Directory # | _____ |
| Re-prompt Message | _____ |

The following List B provides an example of information contained within a group profile. Portions of the group profile may complement the subscriber profile for an individual. Alternatively, the group profile may provide all of the information regarding an individual's subscriber service and preferences.

LIST B

Subscriber Group Name _____
Subscribers In This Group Allowed To Make Calls _____ (Yes/No/Per Subscriber)
    Caller Charge Account and and Charging Privileges
        Charge Account _____ (None/Caller's DN/Per Subscriber)
            Allowed To Charge Call Fees _____ (Yes/No/Per Subscriber)
            Allowed To Charge Caller Line Fees _____ (Yes/No/Per Subscriber)
            Allowed To Charge Callee Line Fees _____ (Yes/No/Per Subscriber)
    Caller Id To Deliver To Callee _____ (None/Caller's DN/Per Subscriber)
    Set Of Commands Available While Waiting For Answer _____ (None/cmd set/Per Subscriber)
    Set Of Commands Available After Call Answered _____ (None/cmd set/Per Subscriber)
    Set Of Commands Available After Callee Disconnects _____ (None/cmd set/Per Subscriber)
Subscribers In This Group Allowed To Receive Calls _____ (Yes/No/Per Subscriber)
    Callee Charge Account and and Charging Privileges
        Charge Account _____ (None/Caller's DN/Per Subscriber)
            Allowed To Charge Call Fees _____ (Yes/No/Per Subscriber)
            Allowed To Charge Caller Line Fees _____ (Yes/No/Per Subscriber)
            Allowed To Charge Callee Line Fees _____ (Yes/No/Per Subscriber)
    The following choices for handling a call to a number are available:
      The call can be routed to the callee's directory number
      The caller can be notified that the call will not be set up
      A message can be taken using the mailbox assigned to the callee's DN
    Initial Call Treatment For Calls To Subscriber In This Group (Only 1 Can Be Yes)
      Treatment Specified On A Per Subscriber Basis _____ (Yes/No)
      Complete/Route Call To Callee's Directory Number _____ (Yes/No)
        Deliver Caller Id _____ (Yes/No)
        Message/Tone For Caller While Waiting For Answer _____
        Amount of Time To Wait For Answer _____ (# sec)
        Callee Command Set Once Callee Answers _____
        Callee Command Set After Caller Has Disconnected _____
      Notify Caller Call Will Not Be Set Up _____ (Yes/No)
        Msg/Tone To Inform Caller Call Will Not Be Setup _____
      Take A Message Using Mailbox Assigned To Callee's DN _____ (Yes/No)
        Message Informing Caller Message Being Taken _____
    If the Initial Setup Attempt For The Call could not be completed (no ckt or busy),
    one of the following choices for handling the call must be made.
    Call Treatment If First Attempt Unable To Be Completed
      Treatment Specified On A Per Subscriber Basis _____ (Yes/No)
      Notify Caller Call Will Not Be Set Up _____ (Yes/No)
        Msg/Tone To Inform Caller Call Will Not Be Setup _____
      Take A Message Using Mailbox Assigned to Callee's DN _____ (Yes/No)
        Message Informing Caller Message Being Taken _____

-continued

LIST B

If the Initial Setup Attempt For The Call was set up but not answered,
one of the following choices for handling the call must be made.
Call Treatment If Call Not Answered
    Treatment Specified On A Per Subscriber Basis _____ (Yes/No)
    Notify Caller Call Will Not Be Set Up _____ (Yes/No)
        Msg/Tone To Inform Caller Call Will Not Be Setup _____
    Take A Message Using Mailbox Assigned to Callee's DN _____ (Yes/No)
        Message Informing Caller Message Being Taken _____
User Interaction Options For Subscribers In This Group
    Language Preference _____ (Based On Country Of Access Location/
                                    Prompt With Multi-Lingual Msg When Needed/
                                    English/Spanish/ ... /Per Subscriber)
    Dialing Preferences For Response To Prompts For Auth Code, Call Prompter, etc.
        Dialing Method _____ (Keypad/Voice or Keypad/Per Subscriber)
        Pre-Digit Time Interval _____ (# sec/Per Subscriber)
        Inter-Digit Time Interval _____ (# sec/Per Subscriber)
        Number Of Retries _____ (#/Per Subscriber)
    Sequence Calling Dialing Preferences
        Prompt Message/Tone _____ (msg name/Per Subscriber)
            Interruptible _____ (Yes/No/Per Subscriber)
        Dialing Method _____ (Keypad/Voice or Keypad/Per Subscriber)
        Pre-Digit Time Interval _____ (# sec/Per Subscriber)
        Inter-Digit Time Interval _____ (# sec/Per Subscriber)
        Number Of Retries _____ (#/Per Subscriber)
        Re-prompt Message/Tone _____ (msg name/Per Subscriber)
            Interruptible _____ (Yes/No/Per Subscriber)

In the case where a portion of an individual subscriber's or preferences are provided in a group profile, the subscriber profile for the individual may identify the group profile and where that group profile is located.

Individual subscriber profiles and/or the group profiles provide comprehensive information regarding the preferences and services of both parties, thereby allowing the call behavior module 130 to process the call in accordance with the subscriber profile information. For example, if the subscriber utilized speed dialing, the individual subscriber profile and/or the group profile would list the particular called numbers with the associated speed dial number. The speed dialing service may also be utilized to readily obtain sub-account numbers and credit card numbers. These numbers would similarly be listed with the associated speed dial numbers. As another example, the individual subscriber profile and/or group profile may also provide information regarding whether the calling party 105 is willing to accept charges for a call based on certain called numbers. Similarly, the subscriber profile may provide information whether the called party 110 is willing to be charged for calls based on the caller ID of the calling party 105. The calls may thereby be charged to a charge account or a sub-account.

The individual subscriber profile and/or group profile may also provide information regarding how the call should be handled depending upon any combination of various factors including, but not limited to, caller ID (the directory number of the calling party), Time of Day (TOD), language preference of the calling party 105, and the calling party's responses. For example, the following List C provides an example of subscriber profile or group profile information for call treatment based on caller ID and TOD:

LIST C

Subscriber Directory Number     _____
Caller Id     _____
Day Of Week     _____
Hour     _____
    The following choices for handling a call to this Called Number are available:
        The call can be routed (routing number could be Callee's DN or a redirection #)
        The caller can be notified that the call will not be set up
        A message can be taken using the mailbox assigned to the callee's DN
    Initial Call Treatment For Calls From This Caller During This Time Of Day
        Complete/Route Call     _____ (Yes/No)
            Routing Number     _____
            Deliver Caller Id     _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Notify Caller Call Will Not Be Set Up _____ (Yes/No)
            Msg/Tone To Inform Caller Call Will Not Be Setup _____
        Take A Message     _____ (Yes/No)
            Mailbox Number     _____
            Message Informing Caller Message Being Taken _____
    If the Initial Setup Attempt For The Call could not be completed (no ckt or busy), -continued

LIST C one of the following choices for handling the call must be made.
Call Treatment If Call Unable To Be Completed
    Notify Caller Call Will Not Be Set Up _____ (Yes/No)
        Msg/Tone To Inform Caller Call Will Not Be Setup _____
    Redirect Call     _____ (Yes/No)
      Redirection Number     _____
      Deliver Caller Id     _____ (Yes/No)
      Message/Tone For Caller While Waiting For Answer _____
      Amount of Time To Wait For Answer _____ (# sec)
      Callee Command Set Once Callee Answers _____
      Callee Command Set After Caller Has Disconnected _____
    Take A Message     _____ (Yes/No)
      Mailbox Number     _____
      Message Informing Caller Message Being Taken _____
If the Initial Setup Attempt For The Call was set up but not answered,
one of the following choices for handling the call must be made.
Call Treatment If Call Not Answered
    Notify Caller Call Will Not Be Set Up _____ (Yes/No)
        Msg/Tone To Inform Caller Call Will Not Be Setup _____
    Redirect Call     _____ (Yes/No)
      Redirection Number     _____
      Deliver Caller Id     _____ (Yes/No)
      Message/Tone For Caller While Waiting For Answer _____
      Amount of Time To Wait For Answer _____ (# sec)
      Callee Command Set Once Callee Answers _____
      Callee Command Set After Caller Has Disconnected _____
    Take A Message     _____ (Yes/No)
      Mailbox Number     _____
      Message Informing Caller Message Being Taken _____
If the Second Setup Attempt For The Call could not be completed,
one of the following choices for handling the call must be made.
Call Treatment If Second Attempt Unable To Be Completed
    Notify Caller Call Will Not Be Set Up _____ (Yes/No)
        Msg/Tone To Inform Caller Call Will Not Be Setup _____
    Take A Message     _____ (Yes/No)
      Mailbox Number     _____
      Message Informing Caller Message Being Taken _____

As another example, the following List D provides an example of individual subscriber profile or group profile information for call treatment based on caller ID only:

LIST D

Subscriber Directory Number     _____
Caller Id     _____
    The following choices for handling a call to this Called Number are available:
      The call can be routed (routing number could be Callee's DN or a redirection #)
      The caller can be notified that the call will not be set up
      A message can be taken using the mailbox assigned to the callee's DN
    Initial Call Treatment For Calls From This Caller
      Complete/Route Call     _____ (Yes/No)
        Routing Number     _____
        Deliver Caller Id     _____ (Yes/No)
        Message/Tone For Caller While Waiting For Answer _____
        Amount of Time To Wait For Answer _____ (# sec)
        Callee Command Set Once Callee Answers _____
        Callee Command Set After Caller Has Disconnected _____
      Notify Caller Call Will Not Be Set Up _____ (Yes/No)
        Msg/Tone To Inform Caller Call Will Not Be Setup _____
      Take A Message     _____ (Yes/No)
      Mailbox Number     _____
      Message Informing Caller Message Being Taken _____
    If the Initial Setup Attempt For The Call could not be completed (no ckt or busy),
    one of the following choices for handling the call must be made.
    Call Treatment If Call Unable To Be Completed
      Notify Caller Call Will Not Be Set Up _____ (Yes/No)
        Msg/Tone To Inform Caller Call Will Not Be Setup _____
      Redirect Call     _____ (Yes/No)
        Redirection Number     _____
        Deliver Caller Id     _____ (Yes/No)

-continued

LIST D

```
    Message/Tone For Caller While Waiting For Answer _____
    Amount of Time To Wait For Answer _____ (# sec)
    Callee Command Set Once Callee Answers _____
    Callee Command Set After Caller Has Disconnected _____
Take A Message                                    _____ (Yes/No)
    Mailbox Number                                _____
    Message Informing Caller Message Being Taken _____
If the Initial Setup Attempt For The Call was set up but not answered,
one of the following choices for handling the call must be made.
Call Treatment If Call Not Answered
    Notify Caller Call Will Not Be Set Up _____ (Yes/No)
        Msg/Tone To Inform Caller Call Will Not Be Setup _____
    Redirect Call                                 _____ (Yes/No)
        Redirection Number                        _____
        Deliver Caller Id                         _____ (Yes/No)
        Message/Tone For Caller While Waiting For Answer _____
        Amount of Time To Wait For Answer _____ (# sec)
        Callee Command Set Once Callee Answers _____
        Callee Command Set After Caller Has Disconnected _____
    Take A Message                                _____ (Yes/No)
        Mailbox Number                            _____
        Message Informing Caller Message Being Taken _____
If the Second Setup Attempt For The Call could not be completed,
one of the following choices for handling the call must be made.
Call Treatment If Second Attempt Unable To Be Completed
    Notify Caller Call Will Not Be Set Up _____ (Yes/No)
        Msg/Tone To Inform Caller Call Will Not Be Setup _____
    Take A Message                                _____ (Yes/No)
        Mailbox Number                            _____
        Message Informing Caller Message Being Taken _____
```

As yet another example, the following List E provides an example of individual subscriber profile or group profile information for call treatment based on the calling party's language preference and TOD:

LIST E

```
Subscriber Directory Number                       _____
Caller's Language Preference                      _____
Day Of Week                                       _____
Hour                                              _____
    The following choices for handling a call to this Called Number are available:
        The call can be routed (routing number could be Callee's DN or a redirection #)
        The caller can be notified that the call will not be set up
        A message can be taken using the mailbox assigned to the callee's DN
    Initial Call Treatment For Calls From Callers With This Language Preference
During This Time Period.
        Complete/Route Call                       _____ (Yes/No)
            Routing Number                        _____
            Deliver Caller Id                     _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Notify Caller Call Will Not Be Set Up _____ (Yes/No)
            Msg/Tone To Inform Caller Call Will Not Be Setup _____
        Take A Message                            _____ (Yes/No)
            Mailbox Number                        _____
            Message Informing Caller Message Being Taken _____
    If the Initial Setup Attempt For The Call could not be completed (no ckt or busy),
    one of the following choices for handling the call must be made.
    Call Treatment If Call Unable To Be Completed
        Notify Caller Call Will Not Be Set Up _____ (Yes/No)
            Msg/Tone To Inform Caller Call Will Not Be Setup _____
        Redirect Call                             _____ (Yes/No)
            Redirection Number                    _____
            Deliver Caller Id                     _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Take A Message                            _____ (Yes/No)
```

LIST E -continued

```
        Mailbox Number                     _____
        Message Informing Caller Message Being Taken _____
If the Initial Setup Attempt For The Call was set up but not answered,
one of the following choices for handling the call must be made.
Call Treatment If Call Not Answered
    Notify Caller Call Will Not Be Set Up _____ (Yes/No)
        Msg/Tone To Inform Caller Call Will Not Be Setup _____
    Redirect Call                          _____ (Yes/No)
        Redirection Number                 _____
        Deliver Caller Id                  _____ (Yes/No)
        Message/Tone For Caller While Waiting For Answer
        Amount of Time To Wait For Answer _____ (# sec)
        Callee Command Set Once Callee Answers _____
        Callee Command Set After Caller Has Disconnected _____
    Take A Message                         _____ (Yes/No)
        Mailbox Number                     _____
        Message Informing Caller Message Being Taken _____
If the Second Setup Attempt For The Call could not be completed,
one of the following choices for handling the call must be made.
Call Treatment If Second Attempt Unable To Be Completed
    Notify Caller Call Will Not Be Set Up _____ (Yes/No)
        Msg/Tone To Inform Caller Call Will Not Be Setup _____
    Take A Message                         _____ (Yes/No)
        Mailbox Number                     _____
        Message Informing Caller Message Being Taken _____
```

As still another example, the following list F provides an example of individual subscriber profile or group profile information for call treatment based on the calling party's response:

LIST F

```
Subscriber Directory Number _____
Caller Response _____
    The following choices for handling a call to this Called Number are available:
        The call can be routed (routing number could be Callee's DN or a redirection #)
        The caller can be notified that the call will not be set up
        A message can be taken using the mailbox assigned to the callee's DN
    Initial Call Treatment For Calls From Callers Selecting This Response
        Complete/Route Call                _____ (Yes/No)
            Routing Number                 _____
            Deliver Caller Id              _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Notify Caller Call Will Not Be Set Up _____ (Yes/No)
            Msg/Tone To Inform Caller Call Will Not Be Setup _____
        Take A Message                     _____ (Yes/No)
            Mailbox Number                 _____
            Message Informing Caller Message Being Taken _____
    If the Initial Setup Attempt For The Call could not be completed (no ckt or busy),
    one of the following choices for handling the call must be made.
    Call Treatment If Call Unable To Be Completed
        Notify Caller Call Will Not Be Set Up _____ (Yes/No)
            Msg/Tone To Inform Caller Call Will Not Be Setup _____
        Redirect Call                      _____ (Yes/No)
            Redirection Number             _____
            Deliver Caller Id              _____ (Yes/No)
            Message/Tone For Caller While Waiting For Answer _____
            Amount of Time To Wait For Answer _____ (# sec)
            Callee Command Set Once Callee Answers _____
            Callee Command Set After Caller Has Disconnected _____
        Take A Message                     _____ (Yes/No)
            Mailbox Number                 _____
            Message Informing Caller Message Being Taken _____
    If the Initial Setup Attempt For The Call was set up but not answered,
    one of the following choices for handling the call must be made.
    Call Treatment If Call Not Answered
        Notify Caller Call Will Not Be Set Up _____ (Yes/No)
            Msg/Tone To Inform Caller Call Will Not Be Setup _____
        Redirect Call                      _____ (Yes/No)
```

-continued

LIST F

```
    Redirection Number         _____
    Deliver Caller Id                    _____ (Yes/No)
    Message/Tone For Caller While Waiting For Answer _____
    Amount of Time To Wait For Answer _____ (# sec)
    Callee Command Set Once Callee Answers _____
    Callee Command Set After Caller Has Disconnected _____
    Take A Message                       _____ (Yes/No)
        Mailbox Number        _____
        Message Informing Caller Message Being Taken _____
    If the Second Setup Attempt For The Call could not be completed,
    one of the following choices for handling the call must be made
    Call Treatment If Second Attempt Unable To Be Completed
        Notify Caller Call Will Not Be Set Up _____ (Yes/No)
            Msg/Tone To Inform Caller Call Will Not Be Setup _____
        Take A Message                   _____ (Yes/No)
            Mailbox Number    _____
            Message Informing Caller Message Being Taken _____
```

The group profile may also provide billing information for members of the group. List G provides an example of billing information that may be provided in the group profile:

LIST G

```
Group Billing Account _____
    Privileges For Some Calls Based On Called # _____ (Yes/No)
    Charging Privileges For All Other Calls
        Charge Account for Call Related Fees _____ (None/Group Acct/Group Acct
If Caller Knows Auth Code)
            Authorization Level Needed   _____
                Sub-Account Code         _____ (None/Collected From Caller/
sub-account #)
        Allowed To Charge Call Fees              _____ (Yes/No)
        Allowed To Charge Any Caller Line Fees   _____ (Yes/No)
        Allowed To Charge Any Callee Line Fees   _____ (Yes/No)
        Authorization Code and Sub-Account Prompt Information
            Prompt Msg for Auth Code     _____
            Interruptible                _____ (Yes/No)
            Re-prompt Message            _____
            Interruptible                _____ (Yes/No)
            Prompt Msg for Sub-Account Code  _____
            Interruptible                _____ (Yes/No)
            Re-prompt Message            _____
            Interruptible                _____ (Yes/No)
```

The group profile may also provide information relating to the charging privileges for calls made to a particular called number. The following List H is an example of such information. The charging privileges may also be subject to requiring the group member enter an authorization code to be entitled to the charging privileges.

LIST H

```
Group Billing Account _____
Called Number(s) _____
    Charging Privileges For Calls To This Number
        Charge Account for Call Related Fees _____ (None/Group Acct/Group Acct
If Caller Knows Auth Code)
            Authorization Level Needed   _____
                Sub-Account Code         _____ (None/Collected From
Caller/sub-account #)
        Allowed To Charge Call Fees              _____ (Yes/No)
        Allowed To Charge Any Caller Line Fees   _____ (Yes/No)
        Allowed To Charge Any Callee Line Fees   _____ (Yes/No)
```

The group profile may also provide information relating to the charging privileges based on the called number. The following list I is an example of such information.

---

LIST I

Subscriber Directory Number _____
Called Number(s) _____
    Charging Privileges For Calls To This Called Number
        Charge Account _____ (None/Caller's DN/Caller's DN If Caller Knows PIN)
        Sub-Account Code _____ (None/Collected From Caller/ sub-account #)
        Allowed To Charge Call Fees         _____ (Yes/No)
        Allowed To Charge Any Caller Line Fees         _____ (Yes/No)
        Allowed To Charge Any Callee Line Fees         _____ (Yes/No)

---

The individual subscriber profile and/or group profile may also allow the subscriber to enter commands which can be processed by the call behavior module 130. Commands may be entered by a calling party 105 in any number of ways including, but not limited to, keypad and voice entry. When a command is entered, the call behavior module 130 may query the group profile or subscriber profile of the party to determine what function is to be performed. The subscriber or group profile will provide instructions on carrying out the command that is entered by the subscriber. As shown in the lists above, different sets of commands may allowed, for example, in situations where the calling party 105 is waiting for the call to be set up, the calling party 105 is waiting for the call to be answered, the call has been answered, the call has been terminated before answer, a message is being taken, and the called party 110 has disconnected.

The subscriber profile may also provide call screening services such that the caller may be notified when a call is being made to a restricted number. The restriction may be for example by geographic area, country code, called number, or by operator assisted calls.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A call processing system for processing telephone calls between a calling party and a called party, the system comprising:

a calling party subscriber profile that comprehensively maintains data that describes subscriber services of the calling party, wherein the calling party subscriber profile is organizable in an individual profile and/or a group profile;

a called party subscriber profile that comprehensively maintains data that describes subscriber services of the called party, wherein the called party subscriber profile is organizable in an individual profile and/or a group profile;

a subscriber profile module that stores the calling party subscriber profile and the called party subscriber profile;

a call behavior module to process the telephone calls in accordance with the calling party subscriber profile and the called party subscriber profile and to resolve one or more service conflicts that occur between the calling party subscriber profile and the called party subscriber profile;

an end user access module of the calling party coupling the call behavior module to the calling party; and an end user access module of the called party coupling the call behavior module to the called party;

wherein a process flow of the call processing system at least in part comprises first, second, third, and fourth process flow times, wherein the second process flow time is subsequent to the first process flow time, wherein the third process flow time is subsequent to the second process flow time, wherein the fourth process flow time is subsequent to the third process flow time;

wherein the calling party accesses the end user access module of the calling party at the first process flow time;

wherein the end user access module of the calling party communicates with the call behavior module at the second process flow time;

wherein the call behavior module accesses the subscriber profile module at the third process flow time;

wherein the subscriber profile module accesses the called party subscriber profile and the calling party subscriber profile between the third and fourth process flow times;

wherein the call behavior module accesses the end user access module of the calling party at the fourth process flow time.

2. The system of claim 1, wherein the subscriber profile module is coupled to the call behavior module and the called party subscriber profile and the calling party subscriber profile for providing profile information to the call behavior module based on the called party subscriber profile and the calling party subscriber profile.

3. The system of claim 1, wherein the called party subscriber profile also comprehensively maintains preferences of the called party and wherein the call behavior module processes the telephone call also in accordance with the preferences of the called party.

4. The system of claim 1, wherein the calling party subscriber profile maintains preferences of the calling party that include a calling party language preference, wherein the called party subscriber profile maintains preferences of the called party that include a called party language preference and, wherein the call behavior module resolves a conflict between the calling party language preference and the called party language preference to route the telephone call to a telephone operator.

5. The system of claim 1, wherein the calling party subscriber profile also comprehensively maintains preferences of the calling party and wherein the call behavior module processes the telephone call also in accordance with the preferences of the calling party.

6. The system of claim 1, wherein the calling party subscriber profile maintains preferences of the calling party that include a language preference, wherein the called party subscriber profile maintains preferences of the called party that include a called party language preference and,
wherein the call behavior module resolves a conflict between the calling party language preference and the called party language preference to route the telephone call to a designated telephone number.

7. The system of claim 1, wherein the end user access module of the called party coupled to the call behavior module serves to provide geographic information of the called party to the call behavior module.

8. The system of claim 1, further comprising means for providing geographic information of the calling party to the call behavior module.

9. The system of claim 8, wherein the call behavior module routes the telephone call to a designated telephone number based on the geographic information of the calling party.

10. The system of claim 8, wherein the call behavior module has means for providing the geographic information of the calling party to the called party.

11. The system of claim 1, further comprising means for providing a message to the calling party from the call behavior module in accordance with the communications capabilities of the calling party.

12. The system of claim 1, wherein the called party subscriber profile and the calling party subscriber profile are located in at least one remote database coupled to the switch via a subscriber profile module.

13. The system of claim 1, wherein the called party subscriber profile is organizable in the group profile, wherein the group profile maintains subscriber service options of a group of subscribers of which the called party is a member and the call behavior module processes the telephone call also in accordance with the group profile.

14. The system of claim 1, further comprising a per call profile for the called party for maintaining subscriber service options based on particular calling numbers, and wherein the call behavior module processes the telephone call also in accordance with the per call profile for the called party.

15. The system of claim 1, wherein the calling party subscriber profile is organizable in the group profile, wherein the group profile maintains subscriber services of a group of subscribers of which the calling party is a member and the call processor processes the telephone call also in accordance with the group profile.

16. The system of claim 1, further comprising a per call profile for the calling party for maintaining subscriber service options based on particular called numbers, and wherein the call behavior module processes the telephone call also in accordance with the per call profile for the calling party.

17. The system of claim 1, wherein the calling party subscriber profile is identified by the directory number of the calling party.

18. The system of claim 1, wherein the calling party subscriber profile is identified by a keyword entered by the calling party during a placed call.

19. The system of claim 1, wherein the call behavior module has means for resolving service conflicts between subscriber service options of the called party and the calling party.

20. The system of claim 1, wherein the subscriber profile module has means for resolving service conflicts between subscriber service options of the calling party.

21. A method for processing a telephone call from a calling party to a called party in accordance with subscriber services of the calling party and the called party, the method comprising the steps of:
receiving a call setup request from the calling party;
obtaining profile information of the calling party and the called party, wherein said profile information provides comprehensive information that relates to the subscriber services of the calling party and the called party, wherein the profile information comprises a calling party subscriber profile and a called party subscriber profile, wherein the calling party subscriber profile is organizable in an individual profile and/or a group profile, wherein the called party subscriber profile is organizable in an individual profile and/or a group profile;
storing the calling party subscriber profile and the called party subscriber profile in a subscriber profile module;
coupling a call behavior module to the calling party through employment of an end user access module of the calling party;
coupling the call behavior module to the called party through employment of an end user access module of the called party;
processing the call based on the profile information of the called party and the calling party;
if one or more service conflicts occur between the profile information of the called party and the calling party, resolving the one or more service conflicts in accordance with the calling party subscriber profile and the called party subscriber profile through employment of the call behavior module;
the calling party in at least one process flow accessing the end user access module of the calling party at a first process flow time;
the end user access module of the calling party in the at least one process flow communicating with the call behavior module at a second process flow time subsequent to the first process flow time;
the call behavior module in the at least one process flow accessing the subscriber profile module at a third process flow time subsequent to the second process flow time;
the subscriber profile module in the at least one process flow accessing the called party subscriber profile and the calling party subscriber profile between the third process flow time and a fourth process flow time subsequent to the third process flow time; and
the call behavior module in the at least one process flow accessing the end user access module of the calling party at the fourth process flow time.

22. The method of claim 21, wherein the step of processing includes the steps of:
(a) determining whether to charge the telephone call to the called party or the calling party; and
(b) determining a call treatment for the telephone call.

23. The method of claim 22, further comprising the step of providing information of the calling party to the called party.

24. The method of claim 23, wherein step of determining the call treatment is a step selected from the group consisting of routing the call to the called party, routing the call another party, taking a message for the called party, and notifying that calling party that the call will not be completed.

25. The method of claim 23, wherein the step of determining the call treatment includes the step of obtaining geographic location information of the calling party and routing the telephone call to a designated telephone number based on the geographic information of the calling party.

26. The method of claim 23, wherein the step of determining the call treatment is achieved from accessing the profile information that is selected from the group consisting of a directory number of the calling party, a response from the calling party, the time of day, geographic location of the calling party and a language preference of the calling party.

27. The method of claim 24, wherein the step of determining the call treatment includes the step of obtaining language preference information of the calling party and routing the telephone call to a designated telephone number based on the preferred language of the calling party.

28. The method of claim 21, wherein the profile information is located in at least one remote database and the step of obtaining the profile information is via the subscriber profile module.

29. The method of claim 21, wherein the step of obtaining the profile information of the calling party and the called party is achieved by retrieving information from the group profile of which the called party is a member.

30. The method of claim 21, wherein the step of obtaining the profile information of the calling party and the called party is achieved by retrieving information from the group profile of which the calling party is a member.

31. The method of claim 21, wherein the step of obtaining the profile information of the calling party and the called party includes the step of identifying the calling party by a directory number of the calling party.

32. The method of claim 21, wherein the step of obtaining the profile information of the calling party and the called party includes the step of identifying the calling party by at least one keyword entered by the calling party during a placed call.

33. The method of claim 21, wherein the step of obtaining the profile information of the calling party and the called party includes the step of identifying the calling party by a credit card number of the calling party.

34. A call processing system for processing a telephone call from a calling party to a called party, the system comprising:
（a) a switch operatively coupling the calling party with the called party;
(b) a calling party subscriber profile operatively coupled to the switch and comprehensively maintaining data describing subscriber services and preferences of the calling party, wherein the calling party subscriber profile is organizable in an individual profile and/or a group profile;
(c) a called party subscriber profile operatively coupled to the switch and comprehensively maintaining data describing subscriber services and preferences of the called party, wherein the called party subscriber profile is organizable in an individual profile and/or a group profile;
(d) a call behavior module coupled to the switch for processing the telephone call in accordance with calling party subscriber profile and called party subscriber profile;
(e) a subscriber profile module coupled to the call behavior module for providing information contained within the calling party subscriber profile and the called party subscriber profile to the call behavior module;
(f) an end user access module of the called party coupling the call behavior module to the called party; and
(g) an end user access module of the calling party coupling the call behavior module to the calling party;
wherein a process flow of the call processing system at least in part comprises first, second, third, and fourth process flow times, wherein the second process flow time is subsequent to the first process flow time, wherein the third process flow time is subsequent to the second process flow time, wherein the fourth process flow time is subsequent to the third process flow time;
wherein the calling party accesses the end user access module of the calling party at the first process flow time;
wherein the end user access module of the calling party communicates with the call behavior module at the second process flow time;
wherein the call behavior module accesses the subscriber profile module at the third process flow time;
wherein the subscriber profile module accesses the called party subscriber profile and the calling party subscriber profile between the third and fourth process flow times;
wherein the call behavior module accesses the end user access module of the calling party at the fourth process flow time.

35. A call processing system for processing a telephone call within a telephone network, the system comprising:
(a) a switch operatively coupled to a calling party and a called party, the calling party and the called party each having profile information of services and preferences of the calling party and the called party, the profile information of the called party and the calling party being located in one or more databases within the telephone network, the database being operatively coupled to the switch;
(b) a subscriber profile module operatively coupled to the switch having means for retrieving the profile information of the calling party and the called party, wherein the profile information comprises a calling party subscriber profile and a called party subscriber profile, wherein the calling party subscriber profile is organizable in an individual profile and/or a group profile, wherein the called party subscriber profile is organizable in an individual profile and/or a group profile;
(c) a call behavior module coupled to the switch for processing the telephone call in accordance with the profile information of the calling party and called party;
(d) an end user access module of the called party coupling the call behavior module to the called party; and
(e) an end user access module of the calling party coupling the call behavior module to the calling party;
wherein a process flow of the call processing system at least in part comprises first, second, third, and fourth process flow times, wherein the second process flow time is subsequent to the first process flow time, wherein the third process flow time is subsequent to the second process flow time, wherein the fourth process flow time is subsequent to the third process flow time;
wherein the calling party accesses the end user access module of the calling party at the first process flow time;
wherein the end use access module of the calling party communicates with the call behavior module at the second process flow time;

wherein the call behavior module accesses the subscriber profile module at the third process flow time;

wherein the subscriber profile module accesses the called party subscriber profile and the calling party subscriber profile between the third and fourth process flow times;

wherein the call behavior module accesses the end user access module of the calling party at the fourth process flow time.

36. A call processor for processing a telephone call from a calling party to a called party, the processor comprising:

(a) means for accessing subscriber service information of the calling party and the called party, wherein the subscriber service information comprises a calling party subscriber profile and a called party subscriber profile, wherein the calling party subscriber profile is organizable in an individual profile and/or a group profile, wherein the called party subscriber profile is organizable in an individual profile and/or a group profile;

(b) coupling means for communications with the calling party and the called party;

(c) a call behavior module containing uniform set of procedures for processing the telephone call based on the subscriber services information of the calling party and the called party;

(d) an end user access module of the called party coupling the call behavior module to the called party; and (e) an end user access module of the calling party coupling the call behavior module to the calling party;

wherein a process flow of the call processor at least in part comprises first, second, third, and fourth process flow times, wherein the second process flow time is subsequent to the first process flow time, wherein the third process flow time is subsequent to the second process flow time, wherein the fourth process flow time is subsequent to the third process flow time;

wherein the calling party accesses the end user access module of the calling party at the first process flow time;

wherein the end user access module of the calling party communicates with the call behavior module at the second process flow time;

wherein the call behavior module accesses the subscriber profile module at the third process flow time;

wherein the subscriber profile module accesses the called party subscriber profile and the calling party subscriber profile between the third and fourth process flow times;

wherein the call behavior module accesses the end user access module of the calling party at the fourth process flow time.

37. The method of claim 21, wherein the step of processing the call based on the profile information of the called party and the calling party comprises the steps of:

obtaining language preference information of the calling party and the called party, wherein the language preference information comprises a calling party language preference and a called party language preference; and resolving a conflict between the calling party language preference and the called party language preference to route the telephone call to a telephone operator.

* * * * *